United States Patent
Huang et al.

(10) Patent No.: US 12,509,112 B2
(45) Date of Patent: Dec. 30, 2025

(54) LEARNING-ORIENTED TRANSFERABLE AUTOMATIC DRIVING METHOD AND SYSTEM DRIVEN BY WORLD MODEL

(71) Applicant: TONGJI UNIVERSITY, Shanghai (CN)

(72) Inventors: Yanjun Huang, Shanghai (CN); Jiatong Du, Shanghai (CN); Shuo Yang, Shanghai (CN); Yulong Bai, Shanghai (CN); Xincheng Li, Shanghai (CN); Hong Chen, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 256 days.

(21) Appl. No.: 18/513,257

(22) Filed: Nov. 17, 2023

(65) Prior Publication Data
US 2024/0083456 A1    Mar. 14, 2024

(30) Foreign Application Priority Data
May 25, 2023  (CN) .......................... 202310599940.6

(51) Int. Cl.
*G06V 20/58*    (2022.01)
*B60W 50/00*    (2006.01)
(Continued)

(52) U.S. Cl.
CPC ...... *B60W 60/001* (2020.02); *B60W 50/0097* (2013.01); *G06V 10/803* (2022.01);
(Continued)

(58) Field of Classification Search
CPC .......... B60W 60/001; B60W 50/0097; B60W 2556/10; B60W 2556/35; B60W 2556/05;
(Continued)

(56) References Cited

U.S. PATENT DOCUMENTS

2020/0174490 A1* 6/2020 Ogale .................... G06N 3/045
2021/0110262 A1* 4/2021 Schmitt ................. G06N 3/045
(Continued)

FOREIGN PATENT DOCUMENTS

CN        116776627 A   *  9/2023   ............ G06F 30/20

OTHER PUBLICATIONS

Reiher, A Sim2Real Deep Learning Approach for the Transformation of Images from Multiple Vehicle-Mounted Cameras to a Semantically Segmented Image in Bird's Eye View, Sep. 23, 2020, 2020 IEEE 23rd International Conference on Intelligent Transportation Systems (ITSC) (Year: 2020).*
(Continued)

*Primary Examiner* — Matthias S Weisfeld

(57) ABSTRACT

The present invention relates to a learning-oriented transferable automatic driving method and system driven by a world model. The method includes the following steps: constructing a simulation environment; collecting a large batch of data in the simulation environment, and collecting a small batch of data in the real environment; constructing a world model, and performing model training in the simulation environment by using the large batch of data, wherein the world model takes a camera image as an input to model an environment by using a generative world model; storing and transmitting historical moment information by hidden variables, and outputting an aerial view and a control instruction; and performing domain adaptive transferring training in the real environment on the basis of the small batch of data, and deploying the model in an autonomous vehicle in the real world to achieve virtuality-to-reality transferring general integrated automatic driving.

10 Claims, 2 Drawing Sheets

(51) Int. Cl.
*B60W 60/00* (2020.01)
*G06V 10/80* (2022.01)
*G06V 10/82* (2022.01)

(52) U.S. Cl.
CPC .............. *G06V 10/82* (2022.01); *G06V 20/58* (2022.01); *B60W 2050/0028* (2013.01); *B60W 2050/0083* (2013.01); *B60W 2420/403* (2013.01); *B60W 2556/05* (2020.02); *B60W 2556/10* (2020.02); *B60W 2556/35* (2020.02)

(58) Field of Classification Search
CPC ............. B60W 2050/0028; B60W 2050/0083; B60W 2420/403; G06V 20/58; G06V 10/803; G06V 10/82
USPC .......................................................... 701/23
See application file for complete search history.

(56) References Cited

U.S. PATENT DOCUMENTS

2022/0157161 A1* 5/2022 Tan ..................... G06F 18/2415
2023/0371610 A1* 11/2023 Moloney ................ G16H 20/10

OTHER PUBLICATIONS

Anthony Hu et al., "Model-Based Imitation Learning for Urban Driving", arXiv:2210.07729 [cs.CV], Nov. 3, 2022, pp. 1-24.

\* cited by examiner

LEARNING-ORIENTED TRANSFERABLE AUTOMATIC DRIVING METHOD AND SYSTEM DRIVEN BY WORLD MODEL

CROSS-REFERENCE TO RELATED APPLICATIONS

This application claims the benefit of priority from Chinese Patent Application No. 202310599940.6, filed on May 25, 2023. The content of the aforementioned application, including any intervening amendments thereto, is incorporated herein by reference in its entirety.

TECHNICAL FIELD

The present invention relates to the technical field of automatic driving, and in particular, to a learning-oriented transferable automatic driving method and system driven by a world model.

BACKGROUND OF THE INVENTION

Nowadays, artificial intelligence is being transitioned from proprietary artificial intelligence to general artificial intelligence, and a generative large model represented by ChatGPT shows extraordinary talents in the field of natural language processing, and becomes an existing mainstream general artificial intelligence model for natural language processing. Automatic driving is a reflection of cross fusion of the automobile industry and a new-generation information technology such as artificial intelligence, automatic control, and big data in the traffic field. A high-grade automatic driving system needs to cope with almost all complex traffic environments and complete driving tasks safely and efficiently.

However, most of existing automatic driving models use a modularization method. The method requires a large amount of artificial engineering and involves manual annotation of a single module and cross-module configuration. A new environment and a new task need to be manually redesigned for algorithm upgrade, so that the method is poor in mobility and cannot adapt to development and requirements of the general artificial intelligence.

As a vehicle-mounted hardware system and the computing capacity of a cloud are continuously upgraded, it is possible to apply the generated large model in real time, and gradual upgrading of the hardware system in the future will break through the general artificial intelligence to solve the bottleneck in hardware.

Anthony Hu, et al. have proposed a method for completing an integrated automatic driving task by modeling using a world model in Model-Based Imitation Learning for Urban Driving, but a complete picture of an environment cannot be obtained only using a single camera, so that the safety of automatic driving cannot be ensured. Furthermore, the method does not consider how to train an automatic driving model from a virtual world to a real world for application.

SUMMARY

The present invention aims to provide a learning-oriented transferable automatic driving method and system driven by a world model, which solves the problem in integrated automatic driving by utilizing a generative large world model and achieves virtuality-to-reality transferring of automatic driving.

The objective of the present invention can be achieved by the following technical solutions:

A learning-oriented transferable automatic driving method driven by a world model includes the following steps:

constructing a simulation environment, and setting, in the simulation environment, automatic driving vehicle configurations that are the same as configurations in a real environment;

collecting a large batch of data in the simulation environment, and collecting a small batch of data in the real environment, wherein the data includes an aerial view and camera images captured by cameras in four directions: front, back, left and right of an automatic driving vehicle, the aerial view is a predefined world thumbnail, traffic vehicles and pedestrians in the aerial view are all marked by rectangular frames, and red traffic lights are marked by lines in a cut-off line region;

constructing a world model, and training the world model in the simulation environment by using the large batch of data, wherein the world model takes a camera image as an input to model an environment by using a generative world model; storing and transmitting historical moment information by hidden variables, and outputting an aerial view and a control instruction, wherein the control instruction is used for controlling the automobile driving automobile;

performing domain adaptive transferring training in the real environment on the basis of the small batch of data by using the trained world model; and deploying the model subjected to the adaptive transferring training in the autonomous vehicle in the real world to achieve virtuality-to-reality transferring general integrated automatic driving.

The automatic driving vehicle configurations include vehicle parameters and sensor parameters.

The world model at historical and current moments is expressed as:

$$\begin{cases} x_k = f_e(o_k) \\ q(s_k) \sim N(\mu_\theta(h_k, a_{k-1}, x_k), \sigma_\theta(h_k, a_{k-1}, x_k)) \\ p(z_k) \sim N(\mu_\varphi(h_k, a_{k-1}), \sigma_\varphi(h_k, a_{k-1})) \\ h_{k+1} = f_\phi(h_k, s_k) \\ a_k = f_{n1}(h_k, s_k) \\ b_k = f_{n2}(h_k, s_k) \end{cases}$$

wherein $o_k$ is an image input at time k; $x_k$ is an image feature obtained by performing multi-sensor-image fusion and encoding on the image input; assuming that a posterior feature $s_k$ and a prior feature $z_k$ are both in accordance with a normal distribution, the posterior feature $s_k$ is generated by sampling a hidden feature $h_k$ containing historical moment information, an action $a_{k-1}$ of a previous moment, and the image feature $x_k$; the prior feature $z_k$ is generated by sampling the hidden feature $h_k$ and the action $a_{k-1}$ of the previous moment; the action $a_{k-1}$ represents a transverse and longitudinal acceleration of moment k−1; a hidden variable $h_{k+1}$ of a next moment is encoded through a recurrent neural network; and $a_k$ represents an action of a current moment, and $b_k$ represents an aerial view of the current moment, both of which are generated on the basis of the hidden feature $h_k$ and the posterior feature $s_k$.

A world model at a future moment cannot obtain an image input; a future action and an aerial view trend are obtained by imagination; specifically, the world model does not generate a posterior feature at a future moment k+T, but generates an action $a_{k+T}$ and an aerial view $b_{k+T}$ directly using a hidden feature $h_{k+T}$ and a prior feature $z_{k+T}$; and a hidden feature $h_{k+T+1}$ at a next moment is generated on the basis of the hidden feature $h_{k+T}$ and the prior feature $z_{k+T}$, expressed as follows:

$$\begin{cases} p(z_k) \sim N(\mu_\varphi(h_k, a_{k-1}), \sigma_\varphi(h_k, a_{k-1})) \\ h_{k+T+1} = f_\phi(h_{k+T}, z_{k+T}) \\ a_{k+T} = f_{\pi 1}(h_{k+T}, z_{k+T}) \\ b_{k+T} = f_{\pi 2}(h_{k+T}, z_{k+T}) \end{cases}$$

The training the world model in the simulation environment by using the large batch of data specifically includes:
taking data from a moment $t_k$ to a moment $t_{k+T-1}$ as historical moment data, taking data from a moment $t_{k+T}$ to a moment $t_{k+T+F}$ as future moment data, inputting all the data from $t_k$ to $t_{k+T+F}$ to a world model for training, so that a joint probability of an action sequence and an aerial view sequence is maximum, that is, $p(a_{k:k+T+F}, b_{k:k+T+F})$ is maximum, and obtaining a lower limit of the joint probability through variational inference, namely:

$$\log(p(a_{k:k+T+F}, b_{k:k+T+F})) \geq \sum_{t=k}^{t=k+T+F} E[\log p(a_t) + \log p(b_t) - D_{KL}(q(s_k), p(z_k))]$$

wherein $D_{KL}$ represents a relative entropy of the two distributions, and E represents an expectation.

A learning-oriented transferable automatic driving system driven by a world model includes:
an environment configuration module, configured to: construct a simulation environment, and set, in the simulation environment, automatic driving vehicle configurations that are the same as configurations in a real environment;
a data acquisition module, configured to: collect a large batch of data in the simulation environment, and collect a small batch of data in the real environment, wherein the data includes an aerial view and camera images captured by cameras in four directions: front, back, left and right of an automatic driving vehicle, the aerial view is a predefined world thumbnail, traffic vehicles and pedestrians in the aerial view are all marked by rectangular frames, and red traffic lights are marked by lines in a cut-off line region;
a world model construction and training module, configured to: construct a world model, and train the world model in the simulation environment by using the large batch of data, wherein the world model takes a camera image as an input to model an environment by using a generative world model; storing and transmitting historical moment information by hidden variables, and outputting an aerial view and a control instruction, wherein the control instruction is used for controlling the automobile driving automobile;
a model transferring module, configured to: perform domain adaptive transferring training in the real environment on the basis of the small batch of data by using the trained world model; and
a model deployment module, configured to deploy the model subjected to the adaptive transferring training in the autonomous vehicle in the real world to achieve virtuality-to-reality transferring general integrated automatic driving.

The automatic driving vehicle configurations include vehicle parameters and sensor parameters.

In the world model construction and training module, the world model at historical and current moments is expressed as:

$$\begin{cases} x_k = f_e(o_k) \\ q(s_k) \sim N(\mu_\theta(h_k, a_{k-1}, x_k), \sigma_\theta(h_k, a_{k-1}, x_k)) \\ p(z_k) \sim N(\mu_\varphi(h_k, a_{k-1}), \sigma_\varphi(h_k, a_{k-1})) \\ h_{k+1} = f_\phi(h_k, s_k) \\ a_k = f_{\pi 1}(h_k, s_k) \\ b_k = f_{\pi 2}(h_k, s_k) \end{cases}$$

wherein $o_k$ is an image input at time k; $x_k$ is an image feature obtained by performing multi-sensor-image fusion and encoding on the image input; assuming that a posterior feature $s_k$ and a prior feature $z_k$ are both in accordance with a normal distribution, the posterior feature $s_k$ is generated by sampling a hidden feature $h_k$ containing historical moment information, an action $a_{k-1}$ of a previous moment, and the image feature $x_k$; the prior feature $z_k$ is generated by sampling the hidden feature $h_k$ and the action $a_{k-1}$ of the previous moment; the action $a_{k-1}$ represents a transverse and longitudinal acceleration of moment k−1; a hidden variable $h_{k+1}$ of a next moment is encoded through a recurrent neural network; and $a_k$ represents an action of a current moment, and $b_k$ represents an aerial view of the current moment, both of which are generated on the basis of the hidden feature $h_k$ and the posterior feature $s_k$.

In the world model construction and training module, a world model at a future moment cannot obtain an image input; a future action and an aerial view trend are obtained by imagination; specifically, the world model does not generate a posterior feature at a future moment k+T, but generates an action $a_{k+T}$ and an aerial view $b_{k+T}$ directly using a hidden feature $h_{k+T}$ and a prior feature $z_{k+T}$; and a hidden feature $h_{k+T+1}$ at a next moment is generated on the basis of the hidden feature $h_{k+T}$ and the prior feature $z_{k+T}$, expressed as follows:

$$\begin{cases} p(z_k) \sim N(\mu_\varphi(h_k, a_{k-1}), \sigma_\varphi(h_k, a_{k-1})) \\ h_{k+T+1} = f_\phi(h_{k+T}, z_{k+T}) \\ a_{k+T} = f_{\pi 1}(h_{k+T}, z_{k+T}) \\ b_{k+T} = f_{\pi 2}(h_{k+T}, z_{k+T}) \end{cases}$$

In the world model construction and training module, the training the world model in the simulation environment by using the large batch of data specifically includes:
taking data from a moment $t_k$ to a moment $t_{k+T-1}$ as historical moment data, taking data from a moment $t_{k+T}$ to a moment $t_{k+T+F}$ as future moment data, inputting all the data from $t_k$ to $t_{k+T+F}$ to a world model for training, so that a joint probability of an action sequence and an aerial view sequence is maximum, that is, $p(a_{k:k+T+F}, b_{k:k+T+F})$ is maximum, and obtaining a lower limit of the joint probability through variational inference, namely:

$$\log(p(a_{k:k+T+F}, b_{k:k+T+F})) \geq$$
$$\sum_{t=k}^{t=k+T+F} E[\log p(a_t) + \log p(b_t) - D_{KL}(q(s_k), p(z_k))]$$

wherein $D_{KL}$ represents a relative entropy of the two distributions, and E represents an expectation.

Compared with the prior art, the present invention has the following beneficial effects:

(1) The present invention provides a virtuality-to-reality transferring method for applying a world model to automatic driving, which can achieve transferring automatic driving from virtual world training to real world application.

(2) A generative world model modeling method provided by the present invention adopts images captured by front, back, left, and right cameras as inputs, so that the world model can know an entire world environment, and the posterior feature is generated after the images obtained by the four cameras are fused and encoded by adopting a sensor fusion method; and the generated posterior feature take the entire world environment into consideration, so that a feature description is more accurate.

(3) In the aspect of generating hidden variables in the world model of the present invention, a recurrent neural network is adopted to generate a hidden variable of a next moment, which takes more considerations to a feature of a previous moment.

(4) The world model of the present invention only outputs an aerial view and an action, and does not generate a current image input, which minishes a network structure and simplifies training steps, and concentrating more loss function training steps on aerial view generation, action generation, and prior and posterior matching improves the training efficiency.

DETAILED DESCRIPTION

The present invention will be described in detail below with reference to the accompanying drawings and specific embodiments. This embodiment is implemented on the premise of the technical solutions of the present invention, and a detailed implementation and a specific operation process are provided, but the scope of the present invention is not limited to the following embodiments.

Embodiment 1

Figure 1:
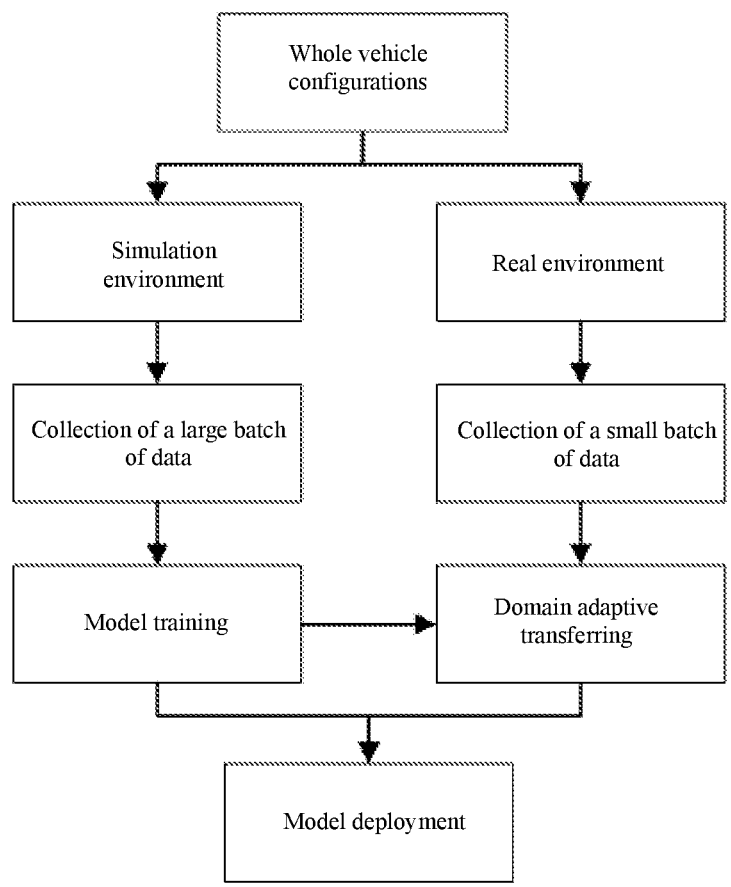
FIG. 1 is a flowchart of a method according to the present invention.

This embodiment provides a learning-oriented transferable automatic driving system driven by a world model, as shown in FIG. 1, including the following steps:

S1: constructing a simulation environment, and setting, in the simulation environment, automatic driving vehicle configurations that are the same as configurations in a real environment.

In this embodiment, the automatic driving vehicle configurations include vehicle parameters and sensor parameters.

S2: collecting a large batch of data in the simulation environment, and collecting a small batch of data in the real environment.

In this embodiment, the collected data includes an aerial view and camera images captured by cameras in four directions: front, back, left, and right, of a automatic driving vehicle. The aerial view, as shown in FIG. 2, is a predefined world thumbnail, traffic vehicles and pedestrians in the aerial view are all marked by rectangular frames, and red traffic lights are marked by lines in a cut-off line region.

S3: constructing a world model, and training the world model in the simulation environment by using the large batch of data.

Figure 2:
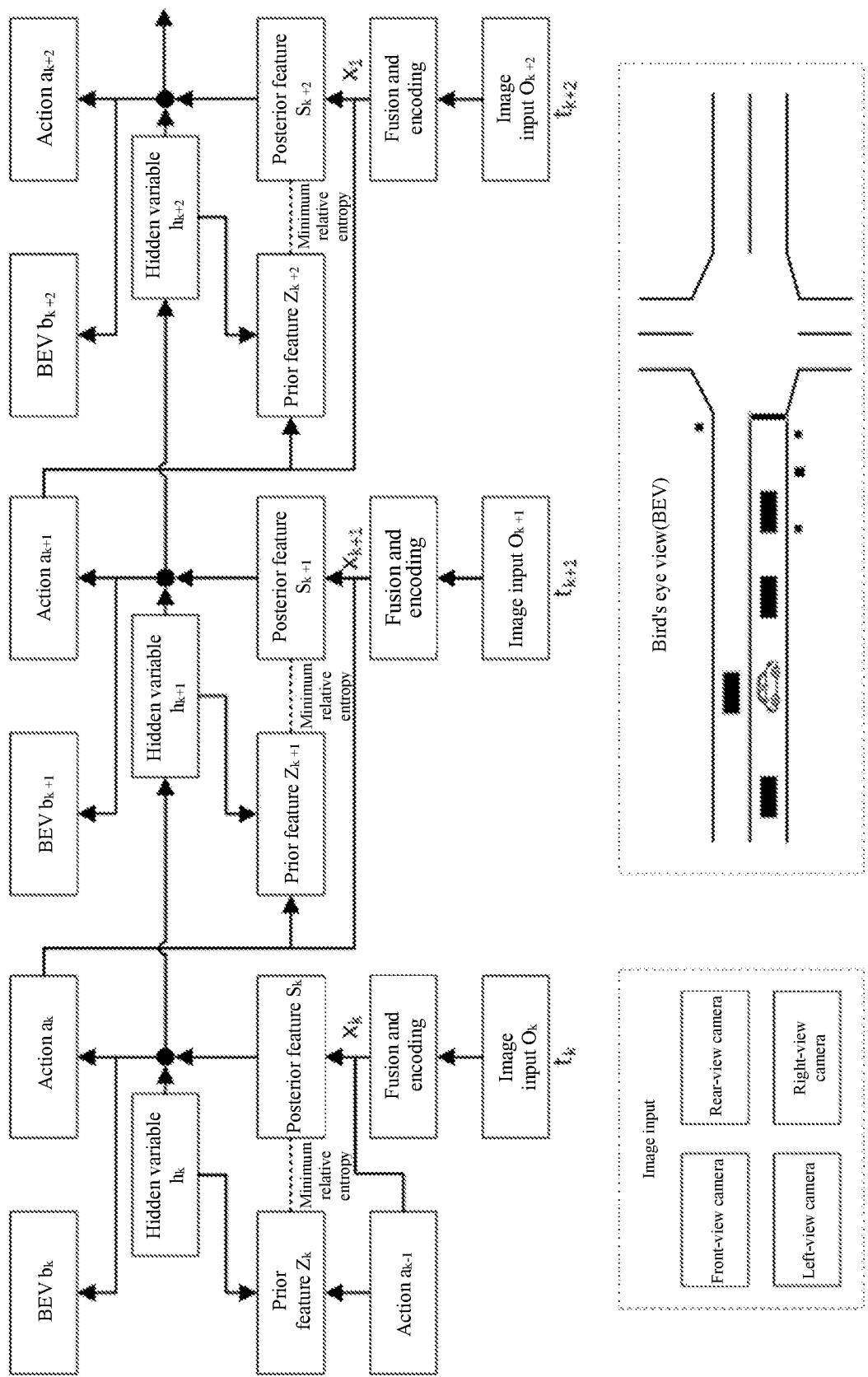
FIG. 2 is a schematic diagram of a framework of a world model according to the present invention.

As shown in FIG. 2, the world model in this embodiment takes a camera image as an input to model an environment by using a generative world model; historical moment information is stored and transmitted by hidden variables, and an aerial view is output to improve the interpretability of the model; and a control instruction is output to control the automobile driving automobile.

For the world model at historical and current moments, as shown in FIG. 2, multi-sensor-image fusion and encoding are performed on an image input $o_k$ at a moment k to obtain an image feature $x_k$. This process can be expressed as $x_k = f_e(o_k)$. Assuming that a posterior feature $s_k$ and a prior feature $z_k$ are both in accordance with a normal distribution, the posterior feature $s_k$ is generated by sampling a hidden feature $h_k$ containing historical moment information, an action $a_{k-1}$ of a previous moment, and the image feature $x_k$, and can be expressed as $q(s_k) \sim N(\mu_\theta(h_k, a_{k-1}, x_k), \sigma_\theta(h_k, a_{k-1}, x_k))$; and the prior feature $z_k$ is generated by sampling the hidden feature $h_k$ and the action $a_{k-1}$ of the previous moment, and can be expressed as $p(z_k) \sim N(\mu_\varphi(h_k, a_{k-1}), \sigma_\varphi(h_k, a_{k-1}))$. A hidden variable of a next moment is encoded through a recurrent neural network, and can be expressed as $h_{k+1} = f_\phi(h_k, s_k)$. Finally, an action $a_k$ of a current moment and an aerial view $b_k$ are generated through the hidden feature $h_k$ and the posterior feature $s_k$, and can be expressed as $a_k = f_{\pi 1}(h_k, s_k)$ and $b_k = f_{\pi 2}(h_k, s_k)$. That is, the world model at historical and current moments is expressed as:

$$\begin{cases} x_k = f_e(o_k) \\ q(s_k) \sim N(\mu_\theta(h_k, a_{k-1}, x_k), \sigma_\theta(h_k, a_{k-1}, x_k)) \\ p(z_k) \sim N(\mu_\varphi(h_k, a_{k-1}), \sigma_\varphi(h_k, a_{k-1})) \\ h_{k+1} = f_\phi(h_k, s_k) \\ a_k = f_{\pi 1}(h_k, s_k) \\ b_k = f_{\pi 2}(h_k, s_k) \end{cases}$$

wherein the action $a_{k-1}$ represents a transverse and longitudinal acceleration of moment k−1, that is, the control instruction used for controlling the automatic driving vehicle.

A world model at a future moment cannot obtain an image input, and a future action and an aerial view trend are obtained by imagination. Specifically, the world model does not generate a posterior feature at a future moment k+T, but generates an action $a_{k+T}$ and an aerial view $b_{k+T}$ directly using a hidden feature $h_{k+T}$ and a prior feature $z_{k+T}$; and a hidden feature $h_{k+T+1}$ at a next moment is generated on the basis of the hidden feature $h_{k+T}$ and the prior feature $z_{k+T}$, $h_{k+T+1} = f_\phi(h_{k+T}, z_{k+T})$. That is, a world model at a future moment is expressed as:

$$\begin{cases} p(z_k) \sim N(\mu_\varphi(h_k, a_{k-1}), \sigma_\varphi(h_k, a_{k-1})) \\ h_{k+T+1} = f_\phi(h_{k+T}, z_{k+T}) \\ a_{k+T} = f_{\pi 1}(h_{k+T}, z_{k+T}) \\ b_{k+T} = f_{\pi 2}(h_{k+T}, z_{k+T}) \end{cases}$$

After the model construction is completed, the training the world model in the simulation environment by using the large batch of data specifically includes:

taking data from a moment $t_k$ to a moment $t_{k+T-1}$ as historical moment data, taking data from a moment $t_{k+T}$ to a moment $t_{k+T+F}$ as future moment data, inputting all the data from $t_k$ to $t_{k+T+F}$ to a world model for training, so that a joint probability of an action sequence and an aerial view sequence is maximum, that is, $p(a_{k:k+T+F}, b_{k:k+T+F})$ is maximum, and obtaining a lower limit of the joint probability through variational inference, namely:

$$\log(p(a_{k:k+T+F}, b_{k:k+T+F})) \geq \sum_{t=k}^{t=k+T+F} E[\log p(a_t) + \log p(b_t) - D_{KL}(q(s_k), p(z_k))]$$

wherein $D_{KL}$ represents a relative entropy of the two distributions, and E represents an expectation.

S4: performing domain adaptive transferring training in the real environment on the basis of the small batch of data by using the trained world model.

Since a simulation data set (the large batch of data) and a real data set (the small batch of data) both adopt the same aerial view format, and the simulation environment and the real environment both use the same whole vehicle configurations, the transferring training is equivalent to fine parameter adjustment after a large model is pre-trained. A transferring training method is well known in the art, and will not be described herein in detail to avoid obscuring the objectives of the present application.

S5: deploying the model subjected to the adaptive transferring training in the autonomous vehicle in the real world to achieve virtuality-to-reality transferring general integrated automatic driving.

Embodiment 2

This embodiment provides a learning-oriented transferable automatic driving system driven by a world model, which is configured to implement the method as described in Embodiment 1 and includes:

(1) an environment configuration module, configured to: construct a simulation environment, and set, in the simulation environment, automatic driving vehicle configurations that are the same as configurations in a real environment;

(2) a data acquisition module, configured to: collect a large batch of data in the simulation environment, and collect a small batch of data in the real environment;

(3) a world model construction and training module, configured to: construct a world model, and train the world model in the simulation environment by using the large batch of data, wherein the world model takes a camera image as an input to model an environment by using a generative world model; storing and transmitting historical moment information by hidden variables, and outputting an aerial view and a control instruction, wherein the control instruction is used for controlling the automobile driving automobile;

(4) a model transferring module, configured to: perform domain adaptive transferring training in the real environment on the basis of the small batch of data by using the trained world model; and (5) a model deployment module, configured to deploy the model subjected to the adaptive transferring training in the autonomous vehicle in the real world to achieve virtuality-to-reality transferring general integrated automatic driving.

The specific implementation process of the system refers to Embodiment 1, and will not be described herein again.

The foregoing describes the preferred embodiments of the present invention in detail. It should be understood that many modifications and changes can be devised by those skilled in the art according to the concept of the present invention without creative work. Therefore, the technical solutions that can be obtained by a person skilled in the art through logical analysis, inference, or limited experiments based on the prior art according to the concepts of the present invention shall all fall within the protection scope defined by the claims.

What is claimed is:

1. A learning-oriented transferable automatic driving method driven by a world model, comprising the following steps:

constructing a simulation environment, and setting, in the simulation environment, same automatic driving vehicle configurations as the real environment;

collecting a first amount of data in the simulation environment, and collecting a second amount of data in the real environment, wherein the first amount of data is greater in quantity than the second amount of data, wherein the first data and the second data comprise bird's eye views and camera images captured by cameras from the front, back, left, and right directions of an automatic driving vehicle; the bird's eye view is a predefined world thumbnail, in which traffic vehicles and pedestrians are all marked with rectangular frames, and red traffic lights are marked with lines in a stop line region;

constructing a world model and training the world model in the simulation environment by using the first amount of data, wherein the world model takes camera images as input and models an environment by using a generative world model; storing and transmitting historical moment information by hidden variables, and outputting a bird's eye view and a control instruction, wherein the control instruction is used for controlling the autonomous vehicle;

performing domain adaptive transferring training in the real environment on the basis of the second amount of data by using the trained world model; and deploying the model completing the adaptive transferring training in the autonomous vehicle in the real world to achieve a general and integrated virtuality-to-reality transferring for automatic driving.

2. The learning-oriented transferable automatic driving method driven by a world model according to claim 1, wherein the automatic driving vehicle configurations comprise vehicle parameters and sensor parameters.

3. The learning-oriented transferable automatic driving method driven by a world model according to claim 1, wherein the world model at historical and current moments is expressed as:

$$\begin{cases} x_k = f_e(o_k) \\ q(s_k) \sim N(\mu_\theta(h_k, a_{k-1}, x_k), \sigma_\theta(h_k, a_{k-1}, x_k)) \\ p(z_k) \sim N(\mu_\varphi(h_k, a_{k-1}), \sigma_\varphi(h_k, a_{k-1})) \\ h_{k+1} = f_\phi(h_k, s_k) \\ a_k = f_{\pi 1}(h_k, s_k) \\ b_k = f_{\pi 2}(h_k, s_k) \end{cases}$$

wherein $o_k$ represents an image input at time k; $x_k$ represents an image feature obtained by performing multi-sensor-image fusion and encoding on the image input; assuming that a posterior feature $s_k$ and a prior feature $z_k$ are both in accordance with a normal distribution, the posterior feature $s_k$ is generated by sampling a hidden feature $h_k$ containing historical moment information, an action $a_{k-1}$ of a previous moment, and the image feature $x_k$; the prior feature $z_k$ is generated by sampling the hidden feature $h_k$ and the action $a_{k-1}$ of the previous moment; the action $a_{k-1}$ represents a transverse and longitudinal acceleration at time k−1; a hidden variable $h_{k+1}$ of a next moment is encoded through a recurrent neural network; and $a_k$ represents an action of a current moment, and $b_k$ represents a bird's eye view of the current moment, both of which are generated on the basis of the hidden feature $h_k$ and the posterior feature $s_k$.

4. The learning-oriented transferable automatic driving method driven by a world model according to claim 3, wherein a world model at a future moment cannot obtain an image input; a future action and a bird's eye view trend are obtained by imagination; specifically, the world model does not generate a posterior feature at a future moment k+T, but generates an action $a_{k+T}$ and a bird's eye view $b_{k+T}$ directly using a hidden feature $h_{k+T}$ and a prior feature $z_{k+T}$; and a hidden feature $h_{k+T+1}$ at a next moment is generated on the basis of the hidden feature $h_{k+T}$ and the prior feature $z_{k+T}$, expressed as follows:

$$\begin{cases} p(z_k) \sim N(\mu_\varphi(h_k, a_{k-1}), \sigma_\varphi(h_k, a_{k-1})) \\ h_{k+T+1} = f_\phi(h_{k+T}, z_{k+T}) \\ a_{k+T} = f_{\pi 1}(h_{k+T}, z_{k+T}) \\ b_{k+T} = f_{\pi 2}(h_{k+T}, z_{k+T}) \end{cases}$$

5. The learning-oriented transferable automatic driving method driven by a world model according to claim 4, wherein training the world model in the simulation environment by using the first amount of data specifically comprises:

taking data from time $t_k$ to $t_{k+T-1}$ as historical moment data, taking data from time $t_{k+T}$ to $t_{k+T+F}$ as future moment data, inputting all the data from $t_k$ to $t_{k+T+F}$ into the world model for training to maximize a joint probability of occurrence of an action sequence and a bird's eye view sequence, that is, to maximize $p(a_{k:k+T+F}, b_{k:k+T+F})$, and obtaining a lower limit of the joint probability through variational inference, namely:

$$\log(p(a_{k:k+T+F}, b_{k:k+T+F})) \geq \sum_{t=k}^{t=k+T+F} E[\log p(a_t) + \log p(b_t) - D_{KL}(q(s_k), p(z_k))]$$

wherein $D_{KL}$ represents a relative entropy between two distributions, and E represents an expectation.

6. A learning-oriented transferable automatic driving system driven by a world model, comprising:

an environment configuration module, configured to: construct a simulation environment, and set, in the simulation environment, same automatic driving vehicle configurations as the real environment;

a data acquisition module, configured to: collect a first amount of data in the simulation environment, and collect a second amount of data in the real environment, wherein the first amount of data is greater in quantity than the second amount of data, wherein the first data and the second data comprise bird's eye views and camera images captured by cameras from the front, back, left, and right directions of an automatic driving vehicle; the bird's eye view is a predefined world thumbnail, in which traffic vehicles and pedestrians are all marked with rectangular frames, and red traffic lights are marked with lines in a stop line region;

a world model construction and training module, configured to: construct a world model and train the world model in the simulation environment by using the first amount of data, wherein the world model takes camera images as input and models an environment by using a generative world model; store and transmit historical moment information by hidden variables, and output a bird's eye view and a control instruction, wherein the control instruction is used for controlling the autonomous vehicle;

a model transferring module, configured to: perform domain adaptive transferring training in the real environment on the basis of the second amount of data by using the trained world model; and a model deployment module, configured to: deploy the model completing the adaptive transferring training in the autonomous vehicle in the real world to achieve a general and integrated virtuality-to-reality transferring for automatic driving.

7. The learning-oriented transferable automatic driving system driven by the world model according to claim 6, wherein the automatic driving vehicle configurations comprise vehicle parameters and sensor parameters.

8. The learning-oriented transferable automatic driving system driven by the world model according to claim 6, wherein in the world model construction and training module, the world model at historical and current moments is expressed as:

$$\begin{cases} x_k = f_e(o_k) \\ q(s_k) \sim N(\mu_\theta(h_k, a_{k-1}, x_k), \sigma_\theta(h_k, a_{k-1}, x_k)) \\ p(z_k) \sim N(\mu_\varphi(h_k, a_{k-1}), \sigma_\varphi(h_k, a_{k-1})) \\ h_{k+1} = f_\phi(h_k, s_k) \\ a_k = f_{\pi 1}(h_k, s_k) \\ b_k = f_{\pi 2}(h_k, s_k) \end{cases}$$

wherein $o_k$ represents an image input at time k; $x_k$ represents an image feature obtained by performing multi-sensor-image fusion and encoding on the image input; assuming that a posterior feature $s_k$ and a prior feature $z_k$ are both in accordance with a normal distribution, the posterior feature $s_k$ is generated by sampling a hidden feature $h_k$ containing historical moment information, an action $a_{k-1}$ of a previous moment, and the image feature $x_k$; the prior feature $z_k$ is generated by sampling the hidden feature $h_k$ and the action $a_{k-1}$ of the previous moment; the action $a_{k-1}$ represents a transverse and longitudinal acceleration at time k−1; a hidden variable $h_{k+1}$ of a next moment is encoded through a recurrent neural network; and $a_k$ represents an action of a current moment, and $b_k$ represents a bird's eye view of the current moment, both of which are generated on the basis of the hidden feature $h_k$ and the posterior feature $s_k$.

9. The learning-oriented transferable automatic driving system driven by a world model according to claim 8, wherein in the world model construction and training module, a world model at a future moment cannot obtain an image input; a future action and a bird's eye view trend are obtained by imagination; specifically, the world model does not generate a posterior feature at a future moment k+T, but generates an action $a_{k+T}$ and a bird's eye view $b_{k+T}$ directly using a hidden feature $h_{k+T}$ and a prior feature $z_{k+T}$; and a hidden feature $h_{k+T+1}$ at a next moment is generated on the basis of the hidden feature $h_{k+T}$ and the prior feature $z_{k+T}$, expressed as follows:

$$\begin{cases} p(z_k) \sim N(\mu_\varphi(h_k, a_{k-1}), \sigma_\varphi(h_k, a_{k-1})) \\ h_{k+T+1} = f_\phi(h_{k+T}, z_{k+T}) \\ a_{k+T} = f_{\pi 1}(h_{k+T}, z_{k+T}) \\ b_{k+T} = f_{\pi 2}(h_{k+T}, z_{k+T}) \end{cases}$$

10. The learning-oriented transferable automatic driving system driven by the world model according to claim 9, wherein in the world model construction and training module, training the world model in the simulation environment by using the first amount of data specifically comprises:

taking data from time $t_k$ to $t_{k+T-1}$ as historical moment data, taking data from time $t_{k+T}$ to $t_{k+T+F}$ as future moment data, inputting all the data from $t_k$ to $t_{k+T+F}$ into the world model for training to maximize a joint probability of occurrence of an action sequence and a bird's eye view sequence, that is, to maximize $p(a_{k:k+T+F}, b_{k:k+T+F})$, and obtaining a lower limit of the joint probability through variational inference, namely:

$$\log(p(a_{k:k+T+F}, b_{k:k+T+F})) \geq \sum_{t=k}^{t=k+T+F} E[\log p(a_t) + \log p(b_t) - D_{KL}(q(s_k), p(z_k))]$$

wherein $D_{KL}$ represents a relative entropy between two distributions, and E represents an expectation.

* * * * *